(12) United States Patent
Subramonian (10) Patent No.: US 12,348,530 B2
(45) Date of Patent: Jul. 1, 2025

(54) SECURE REMOTE WORKER DEVICE AND MANAGEMENT SYSTEM

(71) Applicant: AMZETTA TECHNOLOGIES, LLC, Norcross, GA (US)

(72) Inventor: Shankar Subramonian, Peachtree Corners, GA (US)

(73) Assignee: Amzetta Technologies, LLC, Norcross, GA (US)

( * ) Notice: Subject to any disclaimer, the term of this patent is extended or adjusted under 35 U.S.C. 154(b) by 229 days.

(21) Appl. No.: 18/323,954

(22) Filed: May 25, 2023

(65) Prior Publication Data

US 2023/0396631 A1    Dec. 7, 2023

Related U.S. Application Data

(60) Provisional application No. 63/348,395, filed on Jun. 2, 2022.

(51) Int. Cl.
*H04L 29/06*    (2006.01)
*H04L 9/40*    (2022.01)

(52) U.S. Cl.
CPC ...... *H04L 63/1408* (2013.01); *H04L 63/1441* (2013.01)

(58) Field of Classification Search
None
See application file for complete search history.

(56) References Cited

U.S. PATENT DOCUMENTS

| | | | | |
|---|---|---|---|---|
| 9,578,062 | B2* | 2/2017 | Freudiger | H04L 63/0272 |
| 10,237,239 | B2* | 3/2019 | Douglass | G06F 9/45533 |
| 10,862,773 | B2* | 12/2020 | Chanda | H04L 41/046 |
| 11,409,621 | B2* | 8/2022 | Mishra | G06F 9/45558 |
| 11,411,843 | B2* | 8/2022 | Gowan | H04L 12/4641 |
| 11,924,241 | B1* | 3/2024 | Lakshmanan | H04L 63/1416 |
| 11,997,113 | B2* | 5/2024 | Howlett | H04L 63/1433 |
| 12,200,494 | B2* | 1/2025 | Fellows | H04L 63/1416 |
| 12,225,040 | B2* | 2/2025 | Kraning | H04L 63/107 |
| 2012/0216273 | A1* | 8/2012 | Rolette | G06F 21/577 |
| | | | | 726/13 |
| 2015/0012999 | A1* | 1/2015 | McGee | H04L 63/0227 |
| | | | | 726/13 |
| 2016/0241574 | A1* | 8/2016 | Kumar | H04L 63/12 |
| 2017/0163602 | A1* | 6/2017 | Douglass | H04L 49/70 |
| 2018/0307833 | A1* | 10/2018 | Noeth | G06F 21/554 |
| 2019/0215306 | A1* | 7/2019 | Gopal | G06F 9/45558 |
| 2019/0235934 | A1* | 8/2019 | Chanda | G06F 21/56 |
| 2019/0260804 | A1* | 8/2019 | Beck | G06F 21/556 |
| 2020/0169482 | A1* | 5/2020 | Narayan | H04L 43/20 |
| 2020/0334068 | A1* | 10/2020 | Krishnamurthy | H04L 41/40 |
| 2020/0336316 | A1* | 10/2020 | Jain | H04L 63/205 |
| 2021/0226883 | A1* | 7/2021 | Pawar | H04L 45/745 |
| 2021/0273949 | A1* | 9/2021 | Howlett | H04L 63/1416 |

(Continued)

*Primary Examiner* — Jeffery L Williams
(74) *Attorney, Agent, or Firm* — Meunier Carlin & Curfman LLC (57) ABSTRACT

A secure remote worker (SRW) application that executes in a hypervisor of a user's personal computing device to analyze data and determine if the data is destined for a corporate remote access system or other location. The SRW may perform a security analysis of the data to determine if the data itself or a location associated with the data is known malware. The SRW may be remotely managed to enable and configured.

20 Claims, 6 Drawing Sheets

(56) References Cited

U.S. PATENT DOCUMENTS

| | | | |
|---|---|---|---|
| 2021/0273953 A1* | 9/2021 | Fellows | G06F 21/554 |
| 2021/0360027 A1* | 11/2021 | Boyer | H04L 51/212 |
| 2022/0197716 A1* | 6/2022 | Vijayvargiya | G06F 9/5088 |
| 2023/0080471 A1* | 3/2023 | Jenkinson | G06F 18/23 |
| | | | 726/23 |
| 2023/0095415 A1* | 3/2023 | Boyer | G06F 21/556 |
| | | | 726/23 |
| 2023/0164567 A1* | 5/2023 | Fellows | H04L 63/1416 |
| | | | 455/410 |
| 2023/0396631 A1* | 12/2023 | Subramonian | H04L 63/1441 |
| 2024/0031258 A1* | 1/2024 | Cheng | H04L 43/04 |
| 2024/0064079 A1* | 2/2024 | Kolar | H04L 41/0631 |

* cited by examiner

SECURE REMOTE WORKER DEVICE AND MANAGEMENT SYSTEM

CROSS-REFERENCE TO RELATED APPLICATION

This application claims priority to U.S. Provisional Patent Application No. 63/348,395, filed Jun. 2, 2022, entitled "SECURE REMOTE WORKER DEVICE AND MANAGEMENT SYSTEM," which is incorporated by reference in its entirety.

TECHNICAL FIELD

The present disclosure relates in general to information handling systems, and more particularly to an application for inspecting, analyzing, routing and securing network data traffic from a Computing Device destined to a remote access system or to another Computing Device or to a website.

BACKGROUND

As more and more employees work from home and the value of data continues to increase, individuals and businesses continue to seek ways to provide flexible solutions to secure data, to enable remote network management and troubleshooting, to improve employee productivity when working from home and to analyze network traffic data for improving operational efficiencies. Current solutions to enable users connect to a corporate remote access systems from their personal devices have some limitations. Work-from-users typically piggyback on existing home internet set up. The user sets up the computing device at home and connects it to the existing Wi-Fi network, which then connects to a cable modem and onto the internet. Due to privacy concerns, users are pretty much on their own and cannot expect extensive support from the office IT staff. Home Wi-Fi networks are not typically secured to the level of commercial networks. Since the network data traffic passes through the home Wi-Fi network, which may have other devices also connected to it, security is a major concern. One option is to install virtual private network (VPN) software on the user's computer that is launched to create a secure tunnel to the corporate remote access system. However, VPNs have a limitation in that once connected, all data is communicated from the user's computing device to the remote access system, even if it is not destined for the corporate remote access system. This may overload the remote access system, as large numbers of users connect over a VPN. In addition, VPN systems typically only provide for a secure tunnel and they do not inspect the data to determine if it is associated with malware, or if the user is requesting to connect to a malicious location on the Internet. Another limitation of conventional solutions is that they are not centrally managed. Other solutions, such as a solution based on Software Defined Wide Area Network SDWAN, are available, but typically require the use of a separate device that has to be installed at home, making it expensive. Thus, there is no easy or inexpensive way for a user to get assistance if the user is unable to deploy the device or experiences difficulties in doing so. With the increasing popularity of flexible working hours when working from home, a user is often not aware of the number of hours spent on work and other home-related activities.

SUMMARY

In accordance with the teachings of the present disclosure, the disadvantages and problems associated with protection of data applications may be reduced or eliminated without the need for a VPN or a traditional SDWAN solution.

In accordance with some implementations, there is provided a secure remote worker (SRW) application that executes in a hypervisor of a user's personal computing device to analyze network data traffic, the quality of the network and identify the application that is being run in the hypervisor, when the network data is destined for a corporate remote access system or other locations. The SRW may work in conjunction with a centralized security appliance to perform a security analysis of the data to determine if a location associated with the data is known malware. The SRW may be remotely monitored and managed to enable and configure the SRW.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS., wherein like numbers are used to indicate like and corresponding parts.

Figure 1:
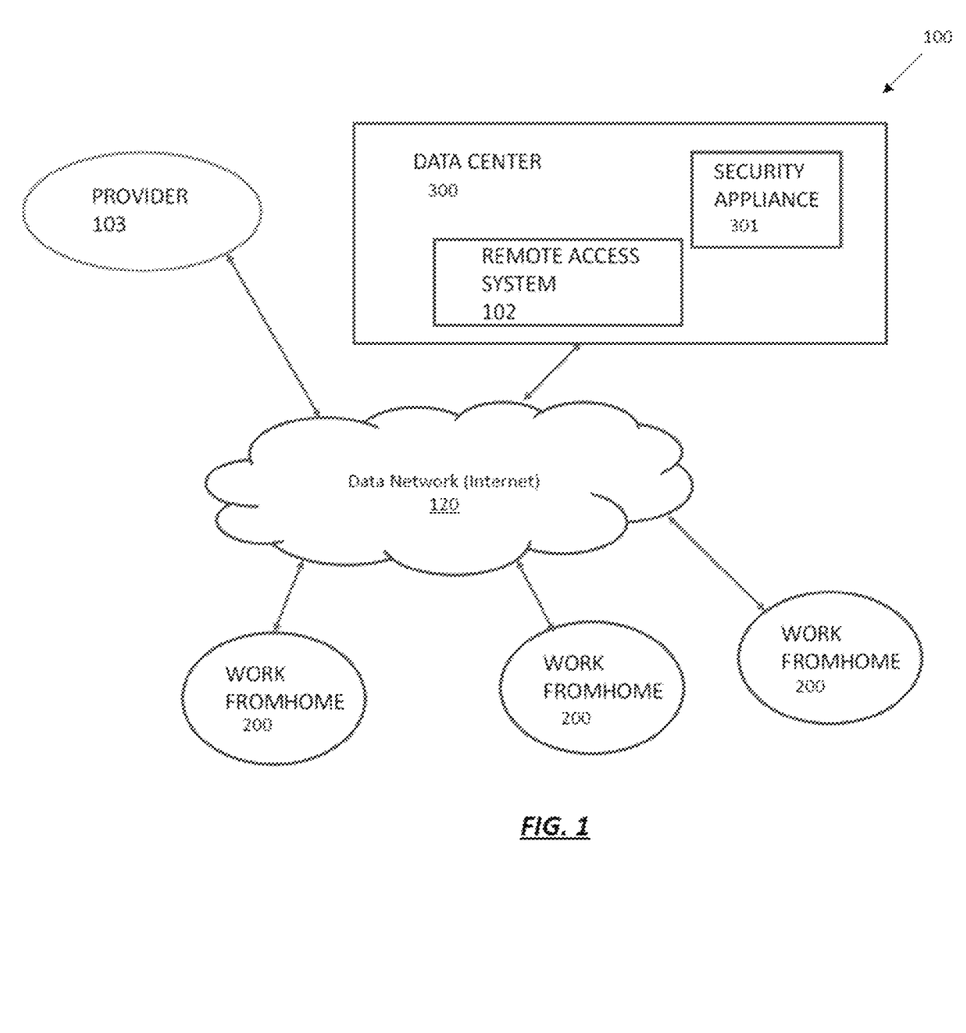
FIG. 1 illustrates an example environment in accordance with the present disclosure.

FIG. 1 illustrates a high-level block diagram of an example environment 100 in accordance with the present disclosure. In the example environment 100 one or more work from home locations 200 may connect to a data center 300 over a data network 120. Within each of the work from home locations 200 there is provided a secure remote worker (SRW) application that executes in a hypervisor of a user's personal computing device 150 to analyze network traffic data and determine if the data is destined for a corporate remote access system 102 or other location. The SRW may perform a security analysis of the data in combination with the security appliance 301 to determine if a location associated with the data is a suspected source of malware. The SRW analyzes network data traffic to identify an application type and other details, and sends its analysis to the Provider 103. A provider system 103 may be a cloud-based or self-hosted management and monitoring service that configures and manages the SRW application, as described below. The security appliance 301 may comprise a standard computing device running security applications such as a firewall, anti-malware, anti-phishing, anti-spam, advance threat protection, Intrusion prevention and detection, etc.

Network traffic is routed through the security appliance 301, as described below. In some implementations, the security appliance 301 may be placed in the home location 200, without otherwise affecting the embodiments disclosed herein. However, this is not a preferred arrangement, since having a security appliance at the home of each remote worker will increase the cost of the security setup. By centralizing the security appliance, the cost of the setup is significantly reduced. Further, by reducing the amount of traffic to the data center 300, the implementations described herein reduce the traffic that passes through the security appliance 301, further reducing the cost of the security setup.

The provider system 103 may be operated by the same or different entity that operates the remote access system 102. The provider 103 is a management platform that provisions (on-boards), configures, monitors, collects logs, network traffic data and status data from a computing device in the work from home location 200, provides a dashboard and performs analytics on the data it collects from the computing device.

The remote access system 102 in the data center 300 may execute on a computing device that includes a processor, a memory communicatively coupled to processor, a network interface communicatively coupled to processor. In accordance with the present disclosure, the remote access system 102 may be associated with an employer or other business entity to which a user of a computing device within a work from home location 200 connects for business or work-related purposes. The remote access system 102 may comprise a standard computer or a server chassis configured to house a plurality of servers or "blades." In yet other embodiments, remote access system 102 may comprise a storage enclosure configured to house a plurality of physical disk drives and/or other computer-readable media for storing data (which may generally be referred to as "physical storage resources").

Figure 2:
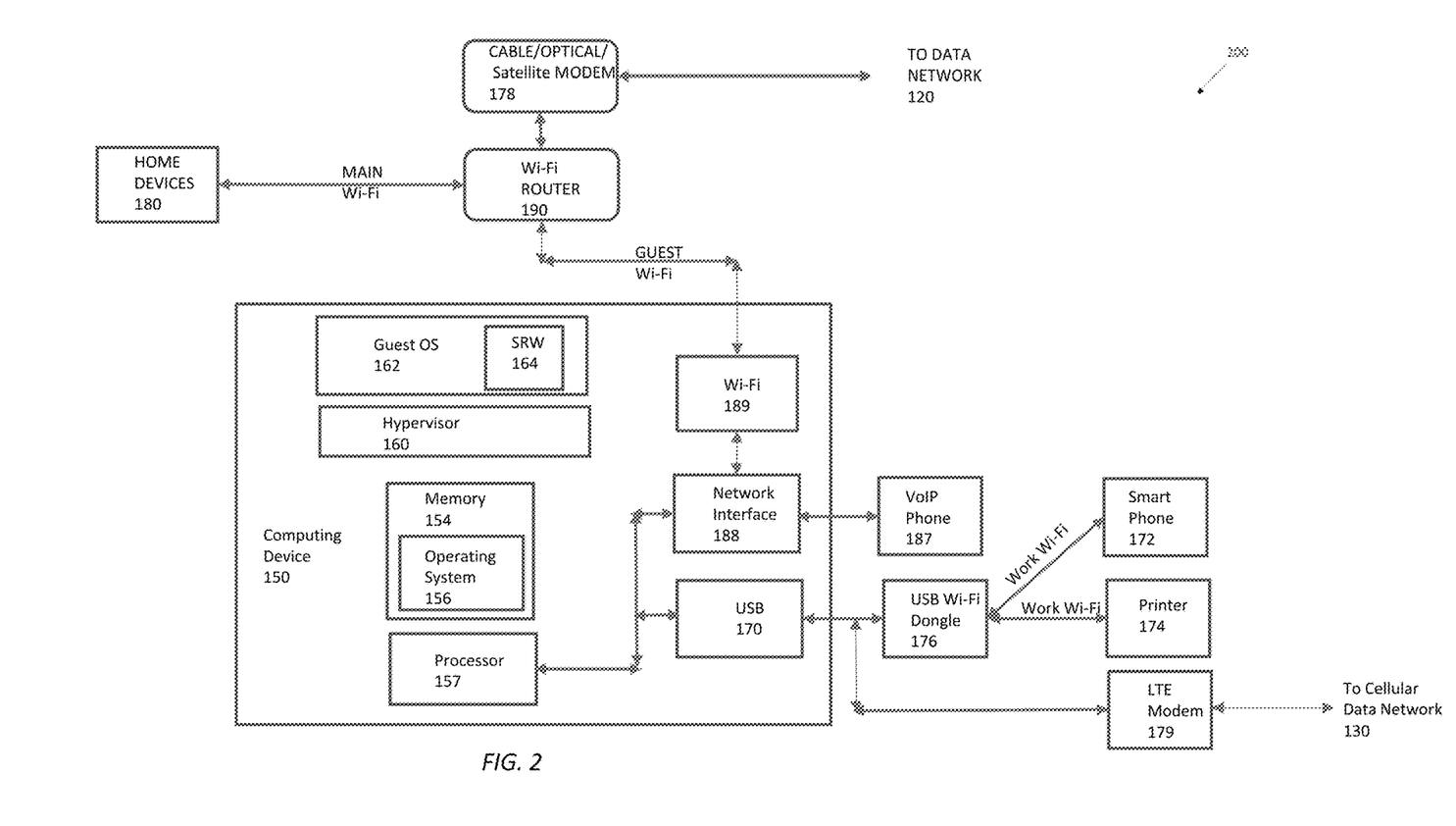
FIG. 2 illustrates an example work from home location in accordance with the present disclosure.

With reference to FIG. 2, there is illustrated an example work from home location 200 in greater detail. The work from home location 200 may include a cable/optical/satellite modem 178, home devices 180, a Wi-Fi router 190, and a personal computing device 150. Generally, home devices 180 will communicate with a Wi-Fi router 190 over the main Wi-Fi connection that provides access to all resources on a home network. The Wi-Fi router 190 may also provide a guest network that logically isolates devices in the work from home location 200 from the main Wi-Fi network. It is noted that the implementations described herein will function even if the home Wi-Fi network is not split into a main Wi-Fi network and guest Wi-Fi network, as shown in FIG. 2.

The personal computing device 150 may be a desktop computer, laptop computer, mobile computer, a tablet computer, and/or notebook computer that has a processor 157, a memory 154 communicatively coupled to processor 157, a network interface 188 communicatively coupled to processor 157. An operating system 156 may execute within the memory 154.

Processor 157 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 157 may interpret and/or execute program instructions and/or process data stored in memory 154.

Memory 154 may be communicatively coupled to processor 157 and may include any system, device, or apparatus configured to retain program instructions and/or data for a period of time (e.g., computer-readable media). Memory 154 may include RAM, EEPROM, a PCMCIA card, flash memory, magnetic storage, opto-magnetic storage, or any suitable selection and/or array of volatile or non-volatile memory that retains data after power to remote access system 102 is turned off.

As shown in FIG. 2, memory 154 may have stored thereon an operating system (OS) 156. Operating system 156 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 156. In addition, operating system 156 may include all or a portion of a network stack for network communication via a network interface (e.g., network interface 188 for communication over the data network 120). Although operating system 156 is shown in FIG. 2 as stored in memory 154, in some embodiments operating system 156 may be stored in storage media accessible to processor 157, and active portions of operating system 156 may be transferred from such storage media to memory 154 for execution by processor 157.

The network interface 188 may comprise one or more suitable systems, apparatuses, or devices operable to serve as an interface between the remote access system 102 and one or more other information handling systems via an in-band network. The network interface 188 may enable the computing device 150 to communicate using any suitable transmission protocol and/or standard and over land lines, and wired and wireless (Wi-Fi) connections. Cellular connections may be handled separately, as described below. In these and other embodiments, network interface 188 may comprise a network interface card, or "NIC," or may be provided on the main board of the computing device 150. The network interface 188 may be enabled to communicate over a data network 120, such as, the Internet, a local area network (LAN) or other through an in-built Wi-Fi 189. The Network Interface 188 also connects to a VoIP phone 187.

The computing device 150 may also include a USB interface 170 that comprises one or more ports to which external peripherals such as a keyboard, a mouse, a USB Wi-Fi dongle 176, an LTE modem 179, an external disk drive, etc. may connect. The USB Wi-Fi dongle creates a localized Wi-Fi network, Work Wi-Fi. A smartphone 172 connects to the USB dongle over Work Wi-Fi. The USB dongle also connects to an LTE Modem 179 which connects to the cellular network 170, to provide an alternate path to the data network (internet) over a 5G or LTE cellular data network 130.

In accordance with the present disclosure, the computing device 150 may execute a guest OS 162 via a Type 2 hypervisor 160, such as the ORACLE VM VIRTUALBOX. In some implementations, a Type 1 hypervisor, such as MICROSOFT HYPER-V may be used, but is not limited to any particular hypervisor. It is important to note that all hypervisors do not support the USB interface. In this embodiment, the features added by the addition of the USB dongle i.e., Work Wi-Fi and LTE Modem 179, are required. This embodiment will require a hypervisor that supports USB. For e.g., the hypervisor from Oracle, Virtual Box is known to support USB, but Microsoft's Hyper-V does not. Within the guest OS 162, one or more applications may execute, such as the secure remote worker (SRW) application 164. The Computer Device 150 is configured to allow SRW to use network interface 188 and the built-in Wi-Fi 189 which connects to, for example, to the guest Wi-Fi network at a user's home to provide isolation from the user's main Wi-Fi home network. In some implementations, the SRW 164 may connect to the user's regular home network. In yet other implementations, the SRW 164 may connect to a hotspot or other network connection to enable data to be communicated between the computing device 150, the provider system 103, the remote access system 102, and other locations reachable over the data network 120. The computing device 150 is configured to include support for USB devices.

Figure 3:
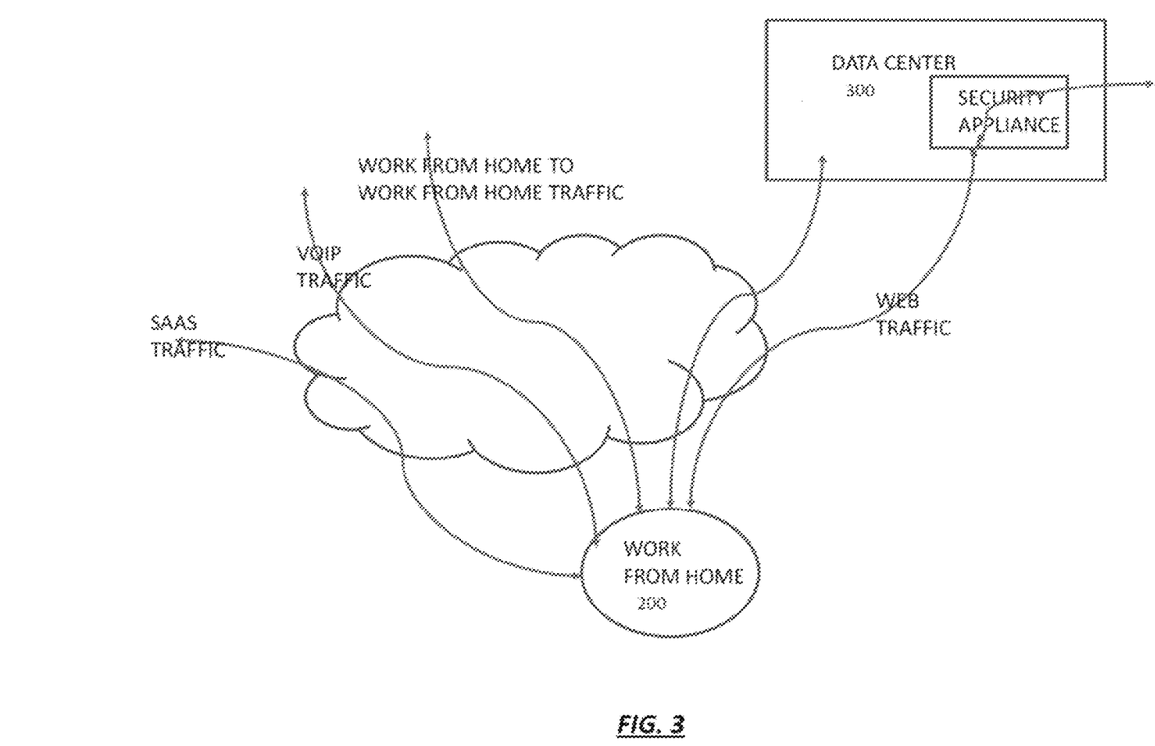
FIG. 3 illustrates example routing paths that data may take in accordance with the present disclosure.

The SRW 164 may provide several routing and security features to the computing device 150. With reference to FIG. 3, the SRW 164 may also analyze data traffic over the network interface 188 using deep packet inspection (DPI) to route data traffic to the appropriate destination using the most direct path available and to prevent backhauling. For example, data traffic that is destined for a known software as a service (SaaS) site, such as, MICROSOFT OFFICE 365 is directed to that site avoiding Data Center 300. Data traffic directed to the remote access system 102 is routed directly by the SRW 164 application to the remote access system 102 to reduce the number of network hops that the data travels over. Data communicated by the computing device 150 to the remote access system 102 would be, e.g., "work" or "business" data associated with the entity who operates remote access system 102. Voice over IP (VoIP) data may be directed directly between endpoints to reduce latency to provide for near real time communication over protocols such as WebRTC. Still further, data traffic that is being communicated between work from home locations 200 may be routed directly between such locations without having to go through Data Center 300. Computing device 150 may also generate data traffic to web sites whose security credentials are unknown and are deemed to be untrusted. Network traffic to and from untrusted websites is said to be untrusted traffic. Much like the way credit score is used for rate creditworthiness, Computing device 150 uses a "reputation score" to establish the security credentials of web sites, to determine if they are trusted or untrusted. Websites which are suspected to source malware or have a poor or unknown track record with respect to security, are assigned lower reputation scores and are untrusted. Web c data traffic that is directed to such web locations, whose security credentials are unknown and therefore have a low reputation score, may be routed to the data center 300 where it is analyzed for security purposes using the security appliance 301. For example, web traffic data may be analyzed to determine if the destination location is an untrusted site or if the data being communicated is associated with malware. Still further, the SRW 164 may monitor the integrity of all the network communication channels over which the data is being communicated to determine latency, jitter, packet loss, etc. and use the network that offers the better performance. Thus, the most optimal path is used in accordance with the type of data being communicated from the work from home location 200 preventing backhauling and extra hops within the data network 120. Yet further, in some implementations with inclusion of a cellular data LTE modem 179, the SRW 164 may use the cellular data network 170 to communicate and/or provide load-balancing features whereby data is communicated over both the data network 120 and the cellular data network. The SRW 164 may also provide for quality of service (QoS) such as a minimum guaranteed bandwidth for certain high priority applications or by prioritizing traffic from certain high priority users (such as the Chief Operating Officer of a business).

In addition to the above, the SRW 164 may encrypt all unencrypted packets before being sent out over the various paths to ensure security. This may include data communicated between the computing device 150 and the data center 300, other work from home locations 200. Data communicated between the computing device 150 and SaaS locations may be encrypted using standard encryption techniques like HTTPS or SSL/TLS. Similarly, data communicated between Computing Device 150 and web sites are generally encrypted using HTTPS and additionally routed through the Security Appliance 301 for a thorough security scrubbing, unless the website is known to be secure site, e.g., google.com. Computing device 150 sends logs of network traffic data to Provider 103 on a regular basis for analytics, report generation and for dashboard display.

The SRW 164 may also be remotely monitored and managed by the provider 103. Provider 103 acts as a collector of network traffic flow data including information about the Application used in the hypervisor. This provides for centralized management and troubleshooting of the SRW 164. The SRW 164 may perform other functions, such as creating logs of all network traffic including, but not limited to: application used, volume of traffic, time, events, alerts, etc. Logs may be used to determine user activities associated with the computing device 150. The analytics created by the Provider 103 from the information sent by SRW 164 may be used by the user to give the user a snapshot of the user's activity. In addition, the analytics may be used by a corporate entity to monitor a user's activity during business hours.

Figure 4:
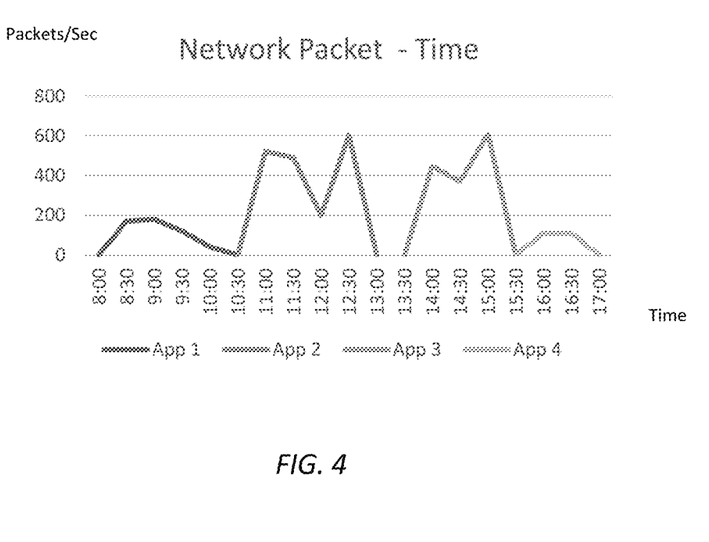
FIG. 4 illustrates the results of an analysis of network data traffic flowing through the SRW.

FIG. 4 provides an example of the type of analysis that the Provider 103 is able to generate, providing an overall picture of the user's activities during work hours 8:00 to 17:00. A productivity index may be created from Table 1, below, and FIG. 4.

TABLE 1

|  | Packets/Sec | | | |
| --- | --- | --- | --- | --- |
| Time | App 1 | App 2 | App 3 | App 4 |
| 8:00 | 0 | | | |
| 8:30 | 170 | | | |
| 9:00 | 180 | | | |
| 9:30 | 120 | | | |
| 10:00 | 40 | | | |
| 10:30 | 0 | 0 | | |
| 11:00 | | 522 | | |
| 11:30 | | 490 | | |
| 12:00 | | 200 | | |
| 12:30 | | 604 | | |
| 13:00 | | 0 | | |
| 13:30 | | | 0 | |
| 14:00 | | | 448 | |
| 14:30 | | | 371 | |
| 15:00 | | | 610 | |
| 15:30 | | | 0 | 0 |
| 16:00 | | | | 110 |
| 16:30 | | | | 110 |
| 17:00 | | | | 0 |

If all four applications App 1, App 2, App 3 and App 5 are known to be work related, the user may reasonably be seen to have been engaged in work related activities during the period 8:00 to 17:00, except for a break during the time 13:00 to 13:30. If however, one of the applications, e.g., App3, is not work related then the user was likely not working on work related activities during the hours 13:30 to 15:30.

In some implementations, the SRW 164 may act as a proxy for external devices, such as a smartphone 172. In this implementation, a USB dongle 176 is connected to USB 170 and creates a local Wi-Fi called "Work Wi-Fi". Work Wi-Fi can be used by corporate devices to communicate with SRW 164 and to take advantage of the features provided by SRW. The smartphone 172 may connect to a dongle connected to the USB interface 170 of the computing device 150. Once connected, the smartphone 172 may send and receive data by the SRW 164 so it may be able to take advantage of the routing and other capabilities of the SRW 164. In this manner, the smartphone may access the remote access system 102. A Voice-over-IP (VoIP) phone 187 may also be connected to Network Interface 188, This may serve as a work phone by communicating over a Voice over IP (VoIP) channel through the SRW 164 to the remote access system 102. In accordance with the present disclosure, the smartphone 172 may use the Computing Device 150 for the following, non-limiting, purposes:

Browsing the web

Email and exchange with other Work from Home sites, SaaS sites, etc.

Voice communication—VoIP packets are routed by Computing Device 150 Video conferencing.

For the use cases above, the data traffic from the smartphone 172 is routed over Work Wi-Fi, through the ISB dongle 176, through the Computing Device 150, onto Guest Wi-Fi and to Data Network 120, not over the LTE or cellular network the smartphone normally communicates over. Smartphone 172 must be configured to enable VoIP communication.

In addition, a VoIP phone 187 may also be connected to the Computing Device 150, when all the voice traffic gets routed by Computing Device 150.

The SRW 164 is also designed to be compliant with popular hypervisors. SRW 164 does not utilize video interfaces for local display. Instead, SRW 164 sends all logs to the provider 103. Provider 103 generates display logs for each user, thereby eliminating the need for a video display support in the hypervisor.

For the purposes of this disclosure, the term "computing device" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

Figure 5:
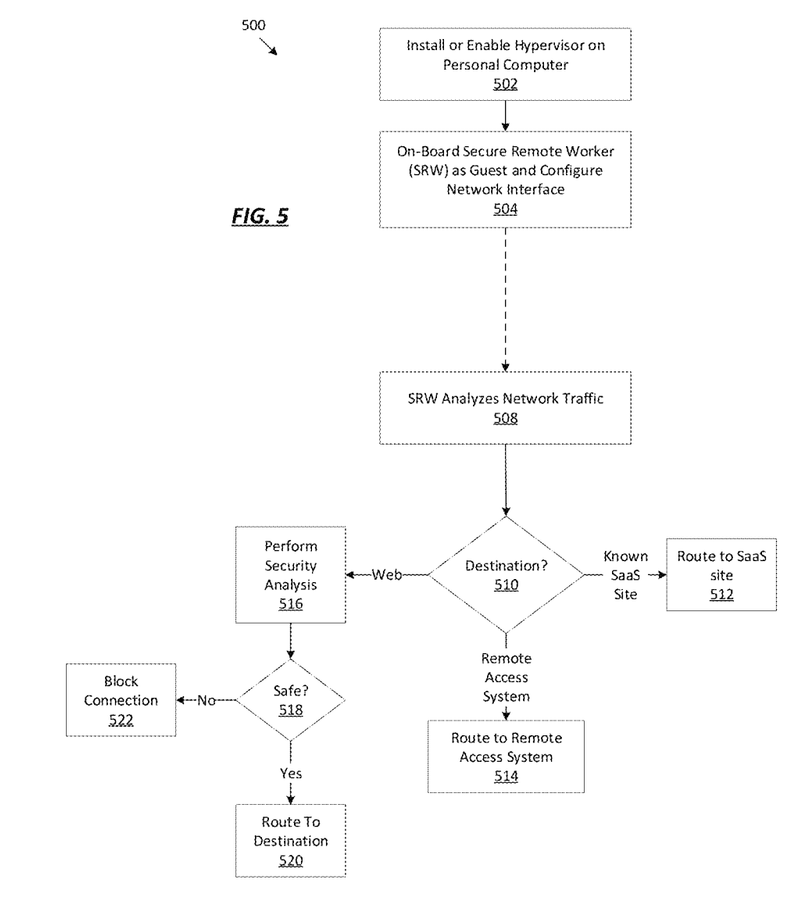
FIG. 5 illustrates a flow chart of example operations performed in accordance with embodiments of the present disclosure.

FIG. 5 illustrates a flow chart of example operations 500 performed in accordance with present disclosure. At 502, a hypervisor is installed or enabled on a user's personal computing device. At 504, the secure remote worker application is on-boarded (added to the Provider's network) and configured, often automatically during the on-boarding process, with the assistance of the Provider 103. The network interface 188 is configured as part of this process.

At a point in time when the user is communicating data, the SRW analyzes the network data traffic at 508. At 510, the destination associated with the data to be communicated is determined by the SRW. If the data is destined for a known SasS site, then it is routed to that site at 512. If the data is destined for the remote access system, then at 514 it is communicated directly to the remote access system 102 to, e.g., reduce the number of hops the data travels. If the data is destined for the web, then a security analysis may be performed by the SRW or provider system at 516. If it is determined to be safe at 518, then the data is routed to the destination 520. If, however, the data is deemed not to be safe at 518, then the connection is blocked at 522.

Figure 6:
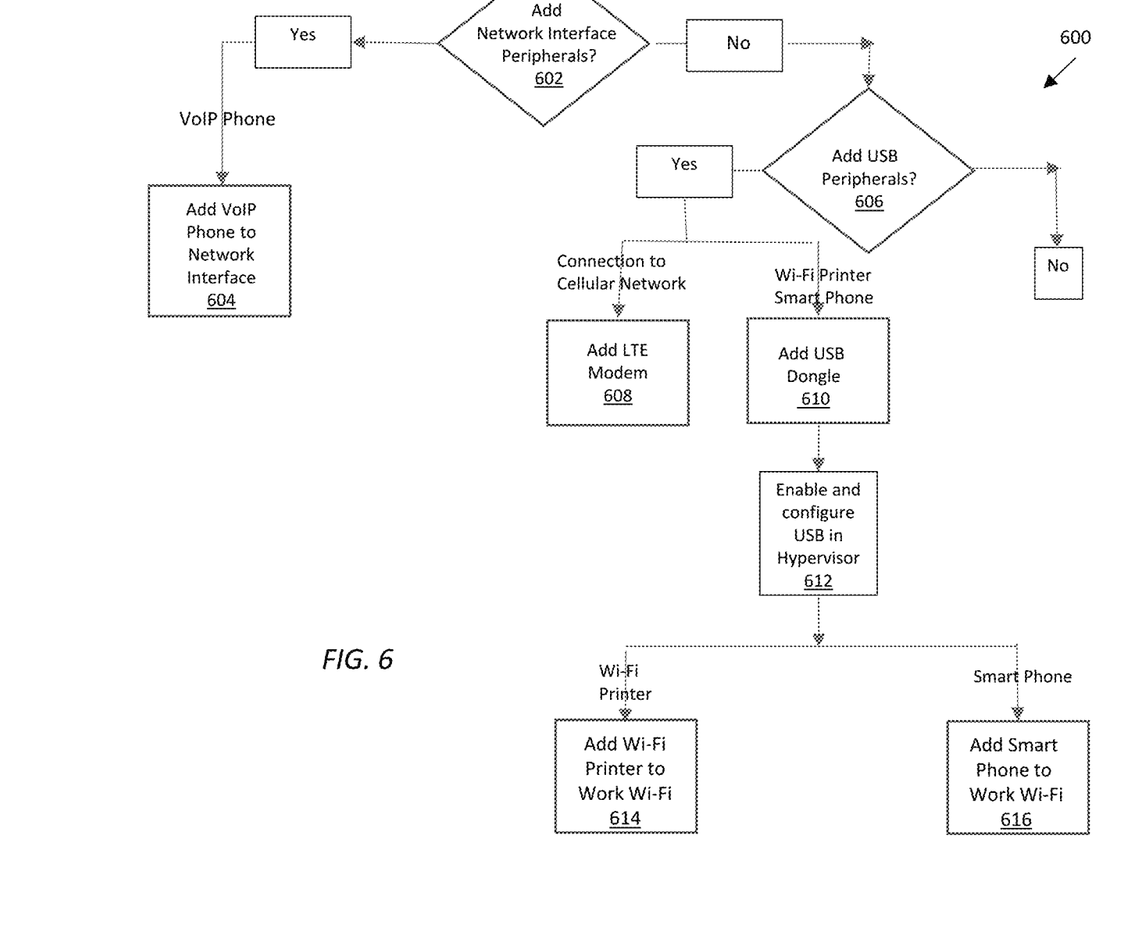
FIG. 6 illustrates a flow chart of example operations to add network and USB peripherals to a computing device

FIG. 6 illustrates a flow chart 600 of example operations to add network and USB peripherals to the computing device 150. At 602 is determined if network interface peripherals are to be added. If yes, then at 604, the VoIP phone 187 is added to the network interface 188. If, at 602, there is not a network interface peripheral to be added, then at 606 is determined if USB peripherals are to be added. If not, the process ends. If, however, at 606, is determined that USB peripherals are to be added, then the system adds either an LTE modem 179 (at 608) and/or a USB Wi-Fi dongle 176 (at 610). If a USB dongle is added at 610, then at 612. USB is configured in the hypervisor 160. Once the USB Wi-Fi dongle is added at 610, then a Wi-Fi printer 174 may be added to the work Wi-Fi network at 614 and/or a smart phone 172 may be added to the work Wi-Fi at 616. Thus, including the capability of adding peripherals to the network interface 188 and the USB interface 170 extends the capabilities of the SRW 164 beyond the computing device 150, while maintaining isolation of the work Wi-Fi network from the home network.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although certain implementations may refer to utilizing aspects of the presently disclosed subject matter in the context of one or more stand-alone computer systems, the subject matter is not so limited but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of securing and routing data on a computing device, comprising:
   running a secure remote worker (SRW) application in a guest within in a hypervisor executing on the computing device;
   performing, by the SRW, a deep packet inspection of data communicated by computing device over a communications network; and
   determining if the data is associated with an untrusted site, and if so, routing the data using the SRW directly to a data center, otherwise routing the data to a destination associated with the data.

2. The method of claim 1, further comprising performing a security scan of the data if the destination is untrusted.

3. The method of claim 1, further comprising performing an analysis of network data traffic to determine a Work from Home workers daily activities and workload.

4. The method of claim 3, wherein phone and smartphone generated voice and data traffic are also routed through the computing device to enable a more accurate analysis of the daily activities and workload.

5. The method of claim 1, wherein corporate traffic is routed over a guest network and home traffic is routed over a main network to achieve separation of network traffic.

6. The method of claim 1, further comprising:
   providing a second network connection for the computing device in addition to a first network connection to a data network, wherein the second network connection serves as a back-up to the first network connection.

7. The method of claim 1, further comprising:
   providing a second network connection for the computing device in addition to a first network connection to a data network, wherein the second network connection augments the first network connection to increase available bandwidth.

8. The method of claim 1, wherein the hypervisor does not support video display.

9. A computer system, comprising: a memory comprising computer-executable instructions; and a processor configured to execute the computer-executable instructions and cause the computer system to perform a method of providing data security and routing to a remote computing device, the computer system executing instructions to:
   run a secure remote worker (SRW) application in a guest within in a hypervisor executing on the computing device;
   perform, by the SRW, a deep packet inspection of data communicated by computing device over a communications network; and
   determine if the data is associated with an untrusted site, and if so, route the data using the SRW directly to a data center, otherwise routing the data to a destination associated with the data.

10. The computer system of claim 9, further executing instructions to perform a security scan of the data if the destination is untrusted.

11. The computer system of claim 9, wherein the SRW performs an analysis of a network data traffic to determine a Work from Home workers daily activities and workload.

12. The computer system of claim 11, wherein phone and smartphone generated voice and data traffic are also routed through the computing device to enable a more accurate analysis of the daily activities and workload.

13. The computer system of claim 9, wherein corporate traffic is routed over a guest network and home traffic is routed over a main network to achieve separation of network traffic.

14. The computer system of claim 9, further comprising:
    a second network connection for the computing device in addition to a first network connection to a data network, wherein the second network connection serves as a back-up to the first network connection.

15. The computer system of claim 9, further comprising:
    a second network connection for the computing device in addition to a first network connection to a data network, wherein the second network connection augments the first network connection to increase available bandwidth.

16. The computer system of claim 9, wherein the hypervisor does not support video display.

17. A non-transitory computer readable medium comprising instructions that, when executed by a processor of a processing system, cause the processing system to perform a method of providing data security and routing to a remote computing device, comprising instructions to:
    run a secure remote worker (SRW) application in a guest within in a hypervisor executing on the computing device;
    perform, by the SRW, a deep packet inspection of data communicated by computing device over a communications network; and
    determine if the data is associated with an untrusted site, and if so, route the data using the SRW directly to a data center, otherwise routing the data to a destination associated with the data.

18. The non-transitory computer readable medium of claim 17, further comprising instructions to perform a security scan of the data if the destination is untrusted.

19. The non-transitory computer readable medium of claim 17, further comprising instructions to perform an analysis of network data traffic to determine a Work from Home workers daily activities and workload.

20. The non-transitory computer readable medium of claim 17, further comprising instructions to route corporate traffic over a guest network and home traffic over a main network to achieve separation of network traffic.

* * * * *